(12) United States Patent
Moore

(10) Patent No.: US 7,098,152 B2
(45) Date of Patent: Aug. 29, 2006

(54) ADHESIVE SUPPORT METHOD FOR WAFER COATING, THINNING AND BACKSIDE PROCESSING

(75) Inventor: John C. Moore, Camarillo, CA (US)

(73) Assignee: General Chemical Performance Products, LLC, Parsippany, NJ (US)

( * ) Notice: Subject to any disclaimer, the term of this patent is extended or adjusted under 35 U.S.C. 154(b) by 160 days.

(21) Appl. No.: 10/899,910

(22) Filed: Jul. 27, 2004

(65) Prior Publication Data

US 2005/0009366 A1  Jan. 13, 2005

Related U.S. Application Data

(62) Division of application No. 10/325,389, filed on Dec. 20, 2002, now Pat. No. 6,869,894.

(51) Int. Cl.
*H01L 21/30* (2006.01)

(52) U.S. Cl. .................. 438/782; 438/758; 427/240

(58) Field of Classification Search ................ 438/782, 438/459, 758; 427/240
See application file for complete search history.

(56) References Cited

U.S. PATENT DOCUMENTS

| | | | |
|---|---|---|---|
| 3,970,494 A * | 7/1976 | Pritchard | 438/464 |
| 4,266,334 A | 5/1981 | Edwards et al. | |
| 5,008,213 A | 4/1991 | Kolesar | |
| 5,087,517 A * | 2/1992 | Sagawa et al. | 428/329 |
| 5,268,065 A | 12/1993 | Grupen-Shemansky | |
| 5,539,013 A * | 7/1996 | Eckberg et al. | 522/75 |
| 5,635,010 A | 6/1997 | Pepe et al. | |
| 5,688,356 A * | 11/1997 | Sagiv | 156/331.7 |
| 5,759,874 A * | 6/1998 | Okawa | 438/124 |
| 5,776,799 A * | 7/1998 | Song et al. | 438/118 |
| 6,273,984 B1 * | 8/2001 | Bourdelais et al. | 156/244.22 |
| 6,358,354 B1 * | 3/2002 | Patil | 156/273.3 |
| 6,478,918 B1 * | 11/2002 | Bennett et al. | 156/248 |
| 6,585,821 B1 * | 7/2003 | Zhuang et al. | 106/287.19 |
| 6,630,050 B1 * | 10/2003 | Moeller et al. | 156/331.7 |
| 6,869,894 B1 * | 3/2005 | Moore | 438/782 |

\* cited by examiner

*Primary Examiner*—Alexander Ghyka
(74) *Attorney, Agent, or Firm*—Arthur J. Plantamura

(57) ABSTRACT

A liquid form adhesive system is provided for spin-coating on wafers and mounting to rigid carrier substrates to support thinning and backside processing. The liquid adhesive comprises about 30–35% of a rosin, between 5–10% of a thermoplastic urethane, a nonionic surfactant present between 1–3%, and a trace of an ultraviolet fluorescing dye. The entire system is dissolved in 50–65%, by weight, of a dual solvent mixture composed of dimethylacetamide and propylene glycol monomethyl ether. When the mixture is made to a specific viscosity, filtered, applied by a spin-coating method to the wafer frontside surface, and cured, the result is a uniform and smooth surface of defined thickness. When the coated wafer is mounted to a rigid substrate, it may be mechanically thinned to thicknesses down to and beyond 25 um, depending upon the wafer composition, diameter, and process. Once thinned, the adhesive is safe for backside processing and is dissolved away at completion to provide a thinned wafer that is clean and ready for final dicing or chipping operations.

11 Claims, 2 Drawing Sheets

ADHESIVE SUPPORT METHOD FOR WAFER COATING, THINNING AND BACKSIDE PROCESSING

Divisional of prior application No. 10/325,389 filed on Dec. 20, 2002, now U.S. Pat. No. 6,869,894.

This invention relates to an adhesive system that facilitates the processing of semiconductor wafers. More specifically, the invention relates to a liquid adhesive system used to coat and planarize a semiconductor wafer surface for subsequent mounting to a rigid substrate upon which thinning and backside processing may be facilitated. Further, in particular, the invention relates to a mixture of polymers and chemistries that yield a product which is applied to a semiconductor wafer by a spin-coating method, producing a uniform and smooth film of defined thickness that provides substantial adhesion benefits that allows: for thinning of the wafer to below 100 um; for improved backside processing; and upon completion of work, for simple dissolution and removal of the adhesive.

BACKGROUND OF THE INVENTION

As the trend in miniaturizing of the integrated circuit (IC) continues, the need for wafer thinning technology will increase. To fully appreciate this need, it is necessary to consider the common and generally accepted phenomena that most, if not all ICs, perform at less than ideal and produce heat as a by product of their function. In a conventional IC, only a minor proportion of the substrate is used for its semiconductor performance. Since semiconductors are poor thermal conductors, they will store the generated heat in their mass. As more heat is produced, more is stored, until a metaphysical limit is reached in the electrical circuit at which efficiencies drop and errors occur. To maintain proper IC function, heat must be continually removed as it is generated.

The common method for IC cooling (i.e. heat removal) is to install blowers which dissipate heat from the printed wire board (PWB). For miniaturized ICs, this means of removing heat is impractical. Hand-held devices such as calculators, cell phones, pagers, and others must depend upon dissipation of heat through conduction. For best results, the IC' substrate is thinned and brought into direct contact with a heat conducting medium, e.g. heat sink. As the IC' heat is generated, it is conducted away (dissipated) by intimate contact with a comparatively large heat sink.

Not only does wafer thinning help to dissipate heat, but it also aids in the electrical operation of the IC. Substrate thickness affects impedance and capacitative performance of certain connecting leads, e.g. transmission lines, of given thickness from the top of the IC to the bottom where contact is made to the PWB. Thick substrates cause an increase in capacitance, requiring thicker transmission lines, and in turn, a larger IC footprint. Substrate thinning increases impedance while capacitance decreases, causing a reduction in transmission line thickness, and in turn, a reduction in IC size. In other words, substrate thinning facilitates IC miniaturization.

An additional incentive in support of substrate thinning involves geometrical reasons. Via-holes are etched on the backside to facilitate frontside contacts. In order to construct a via-hole (hereafter sometimes referred to as a "Via" or "Vias") using common dry-etch techniques, minimum geometrical design standards apply. Namely, for substrate thicknesses of <100 um, a 30–70 um diameter via is constructed using dry-etch methods that produce minimal post-etch residue within an acceptable time. For thick substrates, larger diameter vias will be needed, requiring longer dry etch times, producing greater amounts of post-etch residue, resulting in a significant reduction in throughput. Larger vias require more metalization and in turn, higher cost. Therefore, from the standpoint of backside processing, thin substrates can be processed quicker and at lower cost.

A final consideration in support of thin substrates is that they are more easily cut and scribed into ICs. Thinner substrates have a smaller amount of material to penetrate and cut, and therefore require less effort. Whether the method used is sawing, scribe and break, or laser ablation, ICs are easier to cut from thinner substrates.

Most semiconductor wafers are thinned after frontside operations. For ease of handling, wafers are processed (i.e. frontside devices) at their normal full-size thickness, e.g. 600–700 um (0.024–0.028"). Once completed, they are thinned to 100–150 um (0.004–0.006"). In some cases, as in hybrid substrates used for high power devices, e.g. Gallium Arsenide (GaAs), thickness may be taken down to 25 um (0.001").

Mechanical substrate thinning is performed by bringing the wafer surface in contact with a hard and flat rotating horizontal platter that contains a liquid slurry. The slurry may contain abrasive media with chemical etchants such as ammonia, fluoride, or the combinations thereof. The abrasive operates as a "gross" substrate removal means, i.e. thinning, while the etchant chemistry facilitates "polishing" at the submicron level. The wafer is maintained in contact with the media until an amount of substrate has been removed to achieve a targeted thickness. For a wafer thickness of 300 um or greater, the wafer is held in place with tooling that utilizes a vacuum chuck or some means of mechanical attachment. When wafer thickness is reduced to <300 um, it becomes difficult or impossible to maintain control, e.g. attachment and handling, of the wafer. In some cases, mechanical devices may be made to attach and hold onto thinned wafers, however, they are subject to many problems, especially when processes may vary. For this reason, the wafers are mounted onto a separate rigid (carrier) substrate. This substrate becomes the holding platform for further thinning and post-thinned processing.

Carrier substrates vary between sapphire, quartz, certain glasses, and silicon, and usually exhibit a thickness of 1000 um (1 mm or 0.040"). Substrate choice will depend on how closely matched the coefficient of thermal expansion (CLTE) is between each material.

Since the adhesive becomes incorporated into the wafer-carrier package (wafer package), its properties must include the fundamental criteria of thermal stability. The adhesive must maintain a rigid network over the temperature program of the process such that no mechanical compromise occurs and any reference points established during mounting will be preserved. The maximum temperature exhibited in wafer backside processing occurs during resist baking and via etching. For GaAs processing, these temperatures are typically $\leq 130°$ C.

Another desire of the adhesive is to exhibit good chemical resistance. This must be established for a range of chemistries from strong etchants used in post-thinning stress relief such as sulfuric, ammonia, and/or peroxide, as well as organic solvents used in the lithography and clean steps during via-hole processing. Ideally, the adhesive must be resistant to these process chemistries, yet be selectively dissolved and removed at the end of the manufacturing process line. At times, certain aggressive chemistries may be chosen which have detrimental effects on the adhesive. As such, some temporary manufacturing measures may be taken to include protective tape or other wafer coverings.

From the foregoing described regimen, it is seen that a need exists for an adhesive which: can achieve a planarized and uniform substrate coating; can be mounted to rigid substrates; and is able to withstand the thermal and chemical rigors in a robust yet selective manner to support final removal and cleansing of the wafer. The invention provides an adhesive system that when used at selected process parameters and conditions, affords a mechanism that lends substantial practical support for wafer thinning and backside processing operations.

SUMMARY OF INVENTION

In accordance with this invention, a liquid form adhesive is provided that is applied by spin-on techniques to wafers. The adhesive coated wafers are mounted to rigid substrates and are then prepared for subsequent thinning and backside processing. The adhesive composition includes about 30–35% of a rosin, between 5–10% of a thermoplastic urethane, a nonionic surfactant present at less than about 4%, and a trace i.e., detectable quantity, of an ultraviolet fluorescing dye. The adhesive system is dissolved in a solvent medium comprising of a dual solvent mixture having a concentration of about 50% to about 65% by weight of dimethylacetamide (DMAC) and propylene glycol monomethyl ether (Glyco Ether PM). The mixture is processed through a series of filters to achieve a liquid form adhesive having a particle assay that falls under a threshold value.

The invention also contemplates the provision of methods for applying the described liquid form adhesive to the wafer frontside surface (i.e. device area) by spin-on techniques at specific conditions to achieve a defined thickness. Curing is done by thermal exposure, which evaporates the carrier solvent and produces a uniform and smooth coating. Depending upon the wafer topography and a need for further surface planarization, the process may be repeated to lay down a second layer. Once the wafer is coated and cured, it is mounted to a rigid carrier substrate, e.g. sapphire or other ceramic. Mounting is completed by bringing each surface into contact and applying heat and pressure. At this stage, the wafer exists as part of a mounted package and thinning may proceed. For GaAs (gallium arsenide) wafers, thinning is commonly performed down to less than about 100 um and with respect to some wafers, to about 25 um . Once the wafer is thinned, backside processing can be performed; this includes photolithography, via etching, and metallization. The thinned and processed wafers are then removed from the carrier substrate by dissolving away the cured adhesive by chemical exposure to known solvents determined to be safe for the wafer. Upon completion, thinned and backside processed wafers are produced free of artifacts and residue.

DETAILED DESCRIPTION OF THE INVENTION

Figure 1:
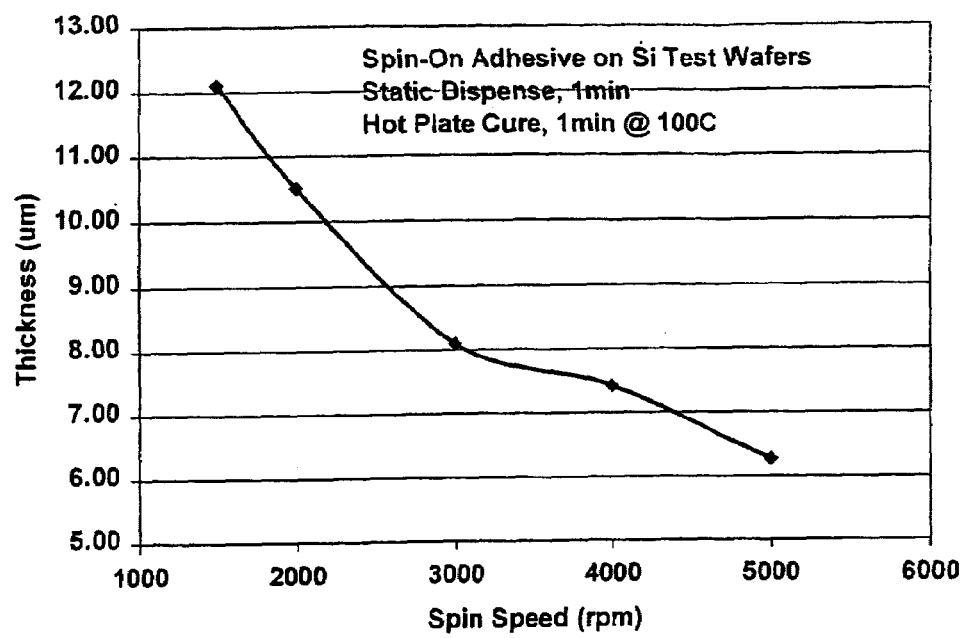
FIG. 1 illustrates the relationship between thickness and spin speed for coating on smooth substrates of the spin-on adhesive.

The invention is a liquid form adhesive composition that is devised to be applied to semiconductor wafers by spin-on techniques, is cured, and subsequently used to mount wafers to rigid substrates. The resultant mounted package provides a framework for the wafer to be thinned, backside processed, and upon completion, the wafer is released in a clean state by simple selective chemical dissolution of the adhesive.

The adhesive composition comprises a blend of polymers combined with additives and a dual solvent system, which by spin-on application and curing, provides a means for penetrating and filling microscopic cavities within the wafer topography to achieve a surface that is smooth and of high uniformity. Said surface produced in accordance with the invention exhibits an adhesive strength suitable for a variety of materials. The derived properties are necessary for successful substrate mounting and subsequent high shear stress wafer thinning and processing. At process completion, selective chemical penetration of the adhesive causes dissolution and removal to release the thinned and processed wafer in a clean and pristine form. The ability of the adhesive in meeting the desired critical objectives is regarded as representing the unique character of the invention.

The characteristics of the basic material components of the invention include thermal and chemical resistance. Considering the processes that ordinarily apply to most wafer thinning and subsequent backside applications, the maximum temperatures observed, range between about 110–130° C. Namely, the heat of friction during high-shear wafer grinding and thinning can be as high as 110° C., depending upon the substrate, pressure, liquid media, and processing speed. Lithographic baking steps may exhibit similar temperatures. Another primary application step which exhibits heat is backside via-hole etching. This is commonly conducted by dry etch methods using a chemical plasma in a high vacuum chamber. Plasma etching in $BF_3$/ $BCl_3$ (boron tri-fluoride/boron tri-chloride) for processing via-holes through GaAs wafers may reach temperatures of 130° C. The adhesive described in this invention has been shown to be compliant to these thermal exposures when holding a wafer in place within a grinder or thinning tool, a lithographic bake oven, and a plasma etcher.

The composition of the invention comprises a rosin polymer to exhibit properties that are capable of holding the wafer in a rigid state during high shear stress and thermal exposures. These properties include thermoplasticity, tackiness (adhesion), hardness, clarity, heat stability, compatibility, and solubility. Rosins are a complex mixture of organic materials having terpene (i.e. pine tree) origin and are industrially sourced from crude gum, wood, and tall oil. The root chemical skeleton from these plant streams include abietane, e.g. abietic acid, and pimarane, e.g. pimaric acid. These acid moieties of terpene have high total acid number (TAN) values ranging from 150–300 mg KOH/g. However, because these resins are commonly in liquid form at ambient, they must be chemically converted to the desired application state by polymerization pathways, e.g. Diels Alder Addition reactions. As the resins are polymerized, they reach high molecular weights, lose some of their TAN, and begin exhibiting the needed properties, e.g. hardness, adhesion, etc.

Commercially available polymerized terpenes include simple polyterpenes, styrenated terpenes, terpene phenols, and esters. The esters include simple rosin esters, dimerized rosin esters, and hydrogenated rosin esters. More specifically, these modified rosin esters include phenolic and maleic varieties.

The preferred rosin is a gum rosin-modified maleic resin characterized by a melting point between 150°–200° C. and a TAN between 150–250 mg KOH/g. The rosin is hydrophilic (i.e. polar), offering high solubility in alcohols, ketones, glycols and glycol ethers. Its concentration in the liquid adhesive invention may occur as high as 50%, and is preferred between 30–35%.

Polymerized rosins exhibit thermoplastic character by melting or flowing at high temperature. However, at low temperatures they are extremely hard and crystalline. Although rigidity may help in processing wafers, the more crystalline a material is, the less strength, e.g. ability to withstand force and shock, that it will exhibit. Namely, many rosins will be very hard to the touch, however, when shaken or abruptly moved, the material will crack in a catastrophic manner to cause complete failure. Rosin coatings or pellets are observed to be very hard and impenetrable. When the surface is impacted or vibrated, cracks appear in the structure and will travel throughout until the entire material is reduced to pieces or dust. The addition of an amorphous ingredient, e.g. thermoplastic polyurethane, has been found to temper or relax the crystallinity of a rosin, and in turn, increase its strength and alleviate the problems of extreme hardness and crystallinity.

A thermoplastic polyurethane (TPU) is chosen as a suitable co-polymer with the identified rosin to add strength to the final product. The TPU exhibits high elastic modulus, yet has excellent hardness. The elastic modulus provides for elasticity and resistance to impact which the rosin alone will likely fail. When the TPU is added to the rosin, there is a noticeable reduction in cracking and shattering due to a relaxed crystallinity, yet the final product is smooth and hard.

The recommended TPU is a non thermosetting product which exhibits a broad softening point in the range of about 50–80° C. Its concentration may range in the adhesive liquid up to about 25% and preferable between about 5–10%.

An emulsifier in an amount effective to maintain solubility and efficacy of the polymer blend as well as to maintain suspension of any microscopic artifacts is employed. Many surfactants exhibit excellent emulsification qualities, especially the non-ionic varieties. Suitable surfactant includes a non-ionic alkoxylated linear alcohol. The surfactant aids in the manufacturing and filtration of the invention by maintaining low surface tension to keep all contact surfaces wetted for maximum desired processing. The same phenomenon applies during wafer coating, where the topography is wetted and the device areas are penetrated. The surfactant preferably has a high cloud point (i.e. >60° C.) to allow for compatibility during heated processing and good solubility for polymeric materials. The non-ionic environment is required for non-reaction towards dissolved metals and metal surfaces. Alternative surfactants include nonyl-phenols and nonyl-ethoxylates with a HLB (hydrophilic/lipophilic balance) ranging from 7–15. Less than about 4% by weight of the non-ionic surfactant is sufficient.

To afford the ability for easy detection, an additive such as, an ultraviolet (UV) fluorescing dye, is incorporated. UV fluorescent dyes exhibit the property of absorbing light of low wavelength (UV) and emitting light of a higher wavelength (visible). Therefore, UV detection of certain fluorescing substances can be highly selective. Using a UV lamp having wavelength near 360 nm, many UV dyes will fluoresce a light blue color to offer easy detection. This type of inspection is needed when detecting for the presence of voids or bubbles in the adhesive after coating and mounting. The method is also used to identify unknown residue where fluorescing locations will have a high likelihood of having adhesive origin.

UV fluorescent substances may be chosen from a broad range of industrial whiteners used for the detergent. Such materials are rooted in the stilbene varieties, e.g. diaminostilbenedisulfonic acid-cyanuric chloride (DASC) trade names Tinopal AMS (Ciba-Geigy) and Blankophor (GAF) or naphthotriazolylstilbene (NTS) trade name Tinopal RBS (Ciba-Geigy), coumarin, e.g. 7-diethylamino-4-methylcoumarin trade names include Uvitex (Ciba-Geigy) and Calcofluor White SD (American Cyanamid). The dye choice in the described invention is based on the DASC type. A minor but effective amount of a suitable dye detector is used. Usually less than about 1 weight percent of the UV fluorescent dye is sufficient.

Characteristics in choosing a solvent system for the invention include suitable solubility, evaporation, e.g. boiling point (BP), and safety. The property of solubility is apparent because the solvent must maintain complete dissolution of the polymers and additives over a range of conditions and time to achieve a good shelf life. The solvent must offer evaporating qualities that are two-fold. Namely 1) the solvent must enable acceptable "fixing" or drying during spin-on techniques such that wafers could be handled by automated equipment, and 2) the evaporation must be controllable during curing so as to not produce bubbling due to rapid exiting of the solvent from the adhesive coating. These characteristics are achievable in accordance with the invention by using a dual solvent system, each solvent having selectively differing BP's, one low and one high.

In using a dual solvent system, only one solvent is needed to exhibit maximum solvency for the noted polymers and additives. Namely, only the high BP solvent is needed to exhibit maximum solvency. This property is recognized during spin-coating and curing. First, as the low BP solvent is evaporated during fixing (hardening) of the adhesive, the high BP solvent is left behind in an "enriched" state with the polymers. The improved solubility of the polymers within the remaining solvent offers stability while evaporation of the low BP solvent occurs. Second, when the adhesive is cured, the high BP solvent maintains the polymer system in a semi-solid state while evaporation of the high BP solvent occurs. The combination of these phenomena provide for very uniform and smooth coatings.

Solvents which were observed to meet the stated criteria in this invention include ketones such as acetone, methyl amyl ketone (MAK), methyl isobutyl ketone (MIBK), gamma-butyrolactone (BLO), and dimethylpiperidone (DMPD), and amides such as dimethylacetamide (DMAC). Other solvents include propylene-based glycol ethers such as propylene glycol monomethyl ether (Glycol Ether PM), propylene glycol normal propyl ether (Glycol Ether PNP), and dipropylene glycol monomethyl ether (Glycol Ether DPM). Additional solvents which may be used, however, may offer reduced solubility, include sulfoxides such as dimethyl sulfoxide, lactates such as ethyl lactate, and alcohols such as isopropyl alcohol and furfuryl alcohol. The solvents considered meet minimum safety requirements, namely, none were tested which were found to trigger extremely hazardous, carcinogenic, or reproductive harm concerns in accordance with the regulations.

The preferred solvent system includes DMAC and Glycol Ether PM. The relative percent of DMAC in comparison to Glycol Ether PM varies from about 30–70%, with a preferred level to be of the order of about 50%.

Using the invention in a spin-on technique involves delivering a specific amount of the adhesive liquid directly to the wafer frontside staged onto the spin-coating tool. Upon delivery of the liquid adhesive, the spin tool is initiated. A vacuum chuck mechanism, which holds onto the wafer, begins to spin. As the wafer spins, centrifugal forces are applied to the liquid adhesive and force the material to the outer edge, where upon reaching that point, excess material is propelled and it becomes airborne from the wafer edge and impacts the equipment bowl where it is collected and sent to a waste receptacle. The fluid that remains on the wafer undergoes a "fixing" process where solvent evaporates, leaving the polymer condensed to a film. The evaporation continues during the spinning process to further harden the coating such that it may be handled without damage. The result is a smooth coating of a defined thickness over the entire wafer surface. Although volume delivery will affect coating thickness, the greatest impact is spin speed, measured as rotations per minute (rpm). When delivering a defined volume to a wafer of a specific diameter and using a spin speed between 1000–2000 rpm, the result is a coating thickness of approximately 10 microns (um). The relationship between thickness and spin speed for coating on smooth substrates of the spin-on adhesive is shown in FIG. 1.

A review of the coating uniformity of the invention indicates that the film formed is smooth and has a total thickness variation (TTV) on a smooth wafer surface approaching about 0.3% for a mean coating thickness between about 10–15 um . Low values of TTV suggest a smooth and uniform surface, a necessary characteristic for successful wafer mounting and subsequent operations.

When coating on patterned wafers (i.e. containing device topography), the TTV ranges from about 1–2 um for 2 coatings, reaching a total thickness of about 25 um . Table 1 indicates the results for coatings of the said invention on 6" GaAs wafers.

TABLE 1

| # Coatings | Thickness (um) | Standard Dev. (um) | TTV (um) |
| --- | --- | --- | --- |
| Single | 10.6 | 0.39 | 1.1 |
| Double | 25.5 | 0.51 | 1.5 |

Table 1 is the measurement of TTV on patterned wafers for single and double coatings of the invention.

The wafer surface must be smooth and planarized for a successful mounting operation. Planarization occurs when, during the coating operation, the liquid adhesive penetrates cavities within the topography and provides a smoothing effect to the surface. Penetration surrounds and protects delicate features such as air bridges and high aspect ratio lines. By surrounding these areas with a hardened polymer, any stress that may be applied during thinning will be evenly distributed throughout the wafer. The penetration of the given feature areas by said invention will transform the irregular topography of the wafer frontside to a surface that is smooth and planarized.

Once the coating of the invention has been applied and cured, attention is directed to the suitable mounting on a carrier substrate. Suitable carrier substrates may comprise sapphire, quartz, glass, and silicon. For most galium arsenide (GaAs) wafer thinning applications, sapphire is most commonly used. The carrier substrates may contain perforations (holes). A perforated substrate is usually chosen when difficulty is anticipated in demount and cleaning, allowing greater solvent contact to the adhesive.

Figure 2:
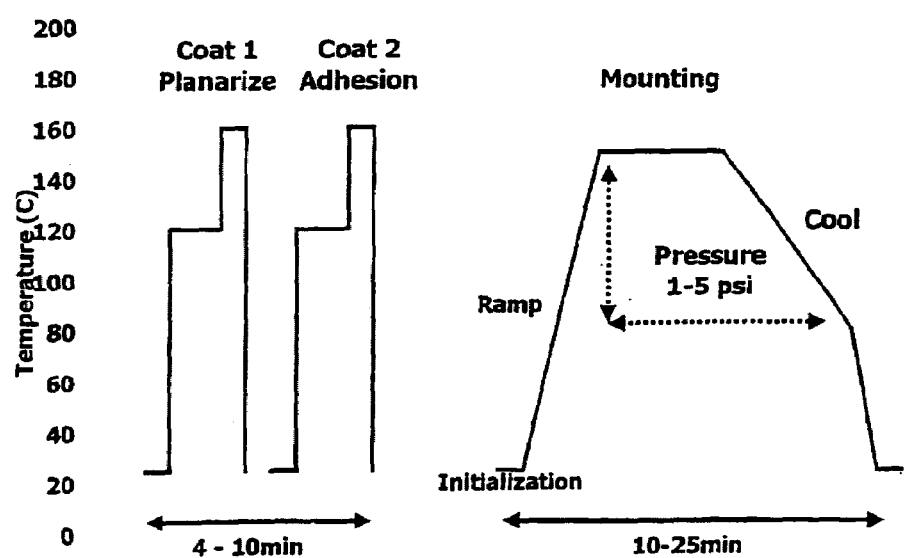
FIG. 2 illustrates a model for wafer coating, curing and mounting on carrier according to the invention.

In applying the method of coating, curing, and mounting of wafers to carrier substrates, a model has been developed. This model describes the target parameters of temperature, pressure, and time to achieve successful mounting and produce a wafer-carrier package (wafer package). The general model for the invention used for wafer coating, curing, and mounting, is illustrated in FIG. 2. Further details are given in the experimental section herein identified in the section, GENERAL PROCEDURE.

FIG. 2. Coating, curing, and mounting model of wafers on carrier.

One the wafer package is completed, it is inspected for uniformity and the presence of artifacts. Thickness of the entire package varies, depending upon the starting dimension of the wafer and carrier substrate. Generally, the thickness ranges from 1400 to 1700 um. When mounting patterned wafers containing 2 cured coatings of the said invention to sapphire carrier substrates, the TTV of the total package was found to be near 4 um . Table 2 indicates the TTV results for 6" GaAs wafers mounted with the said invention to sapphire substrates.

TABLE 2

| Wafer Package (um) | Standard Dev. (um) | TTV (um) |
| --- | --- | --- |
| 1414.3 | 1.4 | 3.9 |

Table 2. Measurement of TTV on a 6" diameter GaAs wafer package mounted with said invention.

Inspection of the adhesive is easily done with an observations microscope by viewing the wafer through the transparent carrier substrate and adhesive invention. Namely, devices may be observed by viewing through the thin cured adhesive film and transparent carrier substrate (i.e. sapphire, glass, etc.). The transparency of the system is a benefit which allows device inspection and simple use of frontside alignment keys as reference locations.

UV fluorescence is detected with the aid of a simple observation microscope having a large focal distance and working area under the objective. With the microscope set-up in a normal observation mode, the specimen is put on the stage and a conventional UV emitting lamp is brought close to allow for excitation of the dye. The lamp is an industrial variety having a large scattered UV type light bulb at 2W or of similar characteristic.

Figure 3:
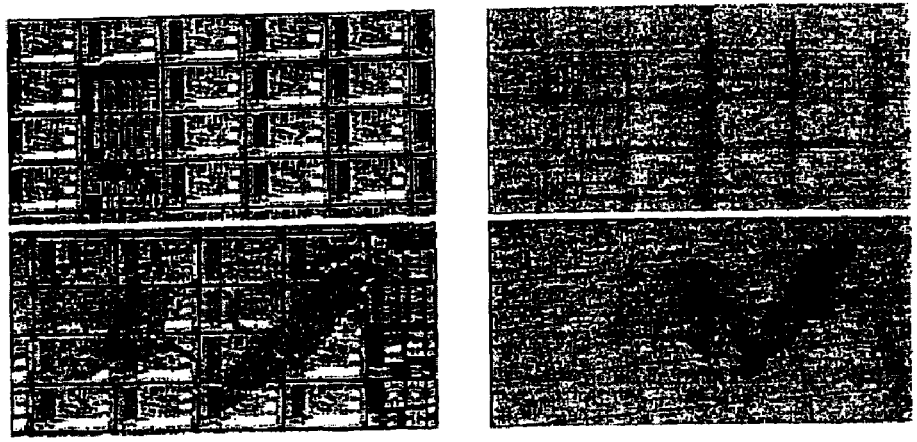
FIG. 3 illustrates grayscale images of two (top and bottom) devices.

With the UV lamp turned on and all white light (conventional light) dimmed or turned off, the operator may observe fluorescence as a light blue emission at all locations where the dye is present. Therefore, this technique may be used to detect the adhesive since it is the carrier for the dye. During wafer inspection, the coated surface is observed to be light blue. Any dark or black locations suggest the lack of adhesive and therefore, the possibility of a void, bubble, or other irregularity. In this case, proper wetting and penetration to microscopic areas in and around the devices on the wafer frontside can be verified. The grayscale images shown in FIG. 3 are two (2) separate device areas (top and bottom) observed with visible light "a" (left) and UV light "b" (right). More detail is shown with UV light (right side). The top image shows a lack of penetration to device crevices (darkened lines—shown on top right) and the bottom image shows more detail on the damaged area (darkened cavities—shown bottom right).

FIG. 3. Grayscale image comparison of two device locations (top & bottom) as observed by visible light (left) and UV light (right). UV light exposed regions (top right) show detail of device crevices without adhesive (dark areas) and additional detail in wafer damage (bottom right).

After inspection, the wafer package is sent through a mechanical wafer thinning process. The thinning process is normally conducted at room temperature conditions using a horizontal rotating platter upon which the wafer package is held in intimate contact. There is a liquid media that is used to reduce friction. This media may contain mild chemistries (e.g. fluoride, ammonia, etc.) and/or fine abrasive media. The abrasive media removes gross (large) amounts of the wafer substrate while the mild chemistries are used for microscopic polishing (etching). At the completion of thinning, the package is entered into a stress relieving process, commonly carried out in a strong chemical etchant (i.e. sulfuric, peroxide, ammonia). The invention is designed to be resistant to many common chemistries used in the stress relief etching process (Table 3). Once stress relief is completed, the package is rinsed, dried and prepared for backside processing.

TABLE 3

| Chemical | Compatibility |
| --- | --- |
| $H_2SO_4$, 6N | YES |
| HCl, 6N | YES |
| $H_3PO_4$, 6N | YES |
| HOAc, 6N | YES |
| $H_2O_2$, 6N | YES |

As shown in Table 3, the compatibility of a cured form of the invention to several chemistries that may be used for stress relief etching are illustratrated. The test conditions were conducted at room temperature for 30 minutes.

Figure 4:
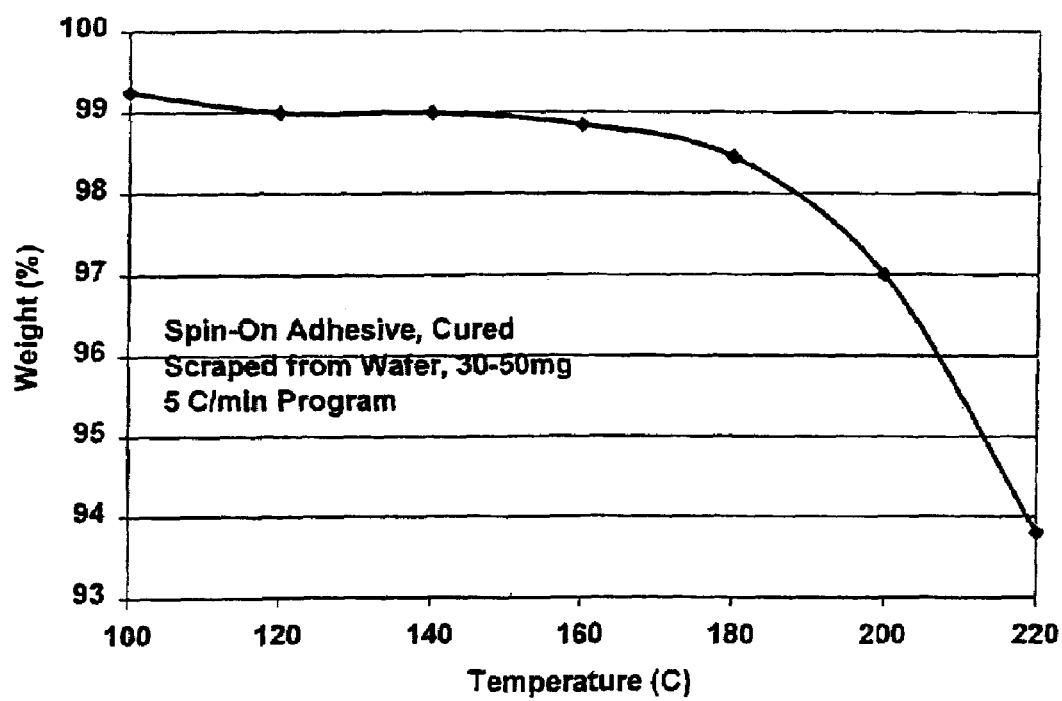
FIG. 4 illustrates a thermogravimetric analysis (TGA) of the invention.

Backside processing includes the patterning and etching of via-holes and subsequent blanket metalization. Patterning is completed through a normal lithography process using photoresist and an aqueous alkaline developer. The liquid adhesive formulation of the invention is resistant to common lithography and development steps used for positive-tone photoresists. Etching is carried out at elevated temperature in a vacuum chamber using a reactive ion etch (RIE) plasma, e.g. $BF_3/BCl_3$ (boron tri-fluoride/boron tri-chloride). The RIE plasma selectively removes the wafer substrate within a pattern to produce via-holes that are continuous from the backside all the way through to a designated contact metal (etch stop) present on the frontside. When cured at the recommended conditions, the invention is compatible up to 130° C. with low outgassing (volatilization). A thermogravimetric analysis (TGA) of the invention at temperatures exceeding 130° C. suggest outgassing to be <0.5% (FIG. 4). Low outgassing is required for successful RIE processes.

The TGA of cured liquid adhesive of the invention coating as shown in FIG. 4 indicating very low outgassing within the cure temperature zone (i.e. 130° C.).

Once via-hole etching is complete, the resist pattern and etch residue is removed by a cleaning process, whereby the wafer is then metalized with a blanket layer of an inert and highly conductive metal, commonly this will be gold (Au). At the chip level, the Au layer provides for rigidity, corrosion resistance, and high conductivity between the backside and the front.

The thinned, backside processed, and metalized wafer is then prepared for demounting (detachment) from the carrier substrate. This process is carried-out in a chemical bath which has high selectivity towards the invention adhesive without compromise to the wafer or the metallic devices present on the frontside. Penetration and dissolution may occur in several chemistries to include those identified as potential solvents for the invention. The process is commonly conducted at elevated temperature and may use measures of agitation such as ultrasonic equipment. Once the wafer is demounted, it is rinsed, dried, and observed to be in a pristine and clean state. The wafer is then ready for dicing into ICs and final packaging to the PWB or other electronic use.

Although the invention has been described in terms of particular embodiments, blends of one or more of the various additives described herein can be used, and substitutes therefore, as will be know to those skilled in the art. Thus the invention is not meant to be limited to the details described herein, but only by the scope of the appended claims.

GENERAL PROCEDURE

Due to the complexity of the system utilized in applying the liquid adhesive of the invention, successful manufacture requires a proper level of attention. In general, the product must be prepared by mixing all liquids first, e.g. solvents+ surfactant, and to follow with the solids in ascending order by weight. A mild addition of heat may be chosen to facilitate successful dissolution. Mixing with the proper vessel and stirring mechanism is required throughout the entire procedure. Once the ingredients are added and are deemed to be completely dissolved, the product is sent through a filtration system of adequate pore size. The filtration design, apparatus, run time, and conditions, are conducted so as to meet a maximum particle assay.

Particle assay is conducted with an electrical sensing zone technique conducted in a prepared electrolyte solution. An example for such equipment is the Multisizer 3 Particle Size Analyzer and Particle Counter, manufactured by Beckman Coulter. The instrument is able to detect the presence of particles between 0.4–1200 um based on electrolytic sensing techniques. The primary benefit of this equipment over conventional laser scattering techniques is the ability to correct for the polymer media. Where laser-based systems generate false positive data due to identity of molecular polymer as "particles," the Multisizer 3 electrolytic system will correct for high solids (molecular) media. The results of such testing is reported in values of counts per mililiter (Cts/ml) and number mean size in microns (um). Based upon testing the said invention, the target values should be <50,000 and $\leq 6$ um for Cts/ml and mean size, respectively. Experience indicates that typical values are usually 9,000–25,000 Cts/ml with a mean size of 3–4 um.

The following summarizes a general method used on spin-coating, hot plates, and mounting equipment to produce a wafer package in which the liquid adhesive of the invention may be applied.

| | |
| --- | --- |
| Objectives: | Two layer coating, >20 um film thickness |
| Spin-On Conditions: | EBR (edge bead removal), exhaust, static 2–4 mL dispense, adhesion promoter not required |
| Curing Conditions: | Soft bake @ 115–125 C. 2 min., hard bake @ 155–160 C. 1 min. |
| Layer One | (Wafer) 500–750 rpm, 10–20 sec. 1000–2000 rpm, 30–60 sec. |

-continued

| | |
|---|---|
| Planarization | Cure, cool to RT |
| Layer Two | Perforated carrier - 2nd coat on wafer, Non-perforated carrier - 2nd coat on carrier |
| Adhesion | 1000–2000 rpm, 30–60 sec. Cure, Cool to RT |
| Mounting | 150 C., Pressure <10 psi, 3–6 min., Cool to <100 C. under pressure |

What is claimed is:

1. A method of processing patterned semiconductor wafers comprising:
   applying on said wafers using a spin-on procedure a coating of a liquid adhesive composition comprising:
   (a) a dual polymer system, including i) from about 30 percent to about 50 percent by weight of a resin tackifier adhesive and ii) from about 5 percent to about 25 percent by weight of a thermoplastic polymer adhesive strengthening agent,
   (b) a dual solvent system for the polymers, comprising a relatively high boiling point and a relatively low boiling point solvent,
   (c) a nonionic surfactant; and
   (d) an ultraviolet (UV) dye detecting agent,
   curing said applied composition,
   mounting said wafer with cured coating onto a rigid substrate for thinning and backside processing of said wafer, and
   subsequently dissolving and removing said coating from the wafer.

2. The method of claim 1 wherein the spin speed employed in applying the liquid adhesive to the wafer is between 1000–2000 rpm and results in coating of an approximate thickness of 10 microns (um) exhibiting a total thickness variation (TTV) of approximately 1 um.

3. The method of claim 1 wherein after the completion of a first spin-on application of the liquid adhesive using, when required, subsequent applications to obtain a coating of an approximate thickness of 25 microns (um) exhibiting a total thickness variation (TTV) of approximately 1–2 um.

4. The method of claim 3 wherein after application of the liquid adhesive a wafer package is obtained with a thickness of approximately 1000–2000 microns (um) and exhibiting a total thickness variation (TTV) of approximately 4 microns (um).

5. The method of claim 4 wherein a wafer package containing the spin-on liquid adhesive is chemically resistant to the etch chemistries used for post grinding and thinning stress relief.

6. The method of claim 1 wherein flaws including voids or bubbles are detected in the mounted wafer package by incorporating in the liquid adhesive a coating of diaminostilbenedisulfonic acid-cyanuric chloride ultraviolet (UV) fluorescent dye detecting agent as a means for emitting light of approximately 360 nm to excite the UV absorbing dye present, which in turn, produces a fluorescence in the visible range that can be easily observed with the aid of a simple observation microscope.

7. The method of claim 1 which utilizes a dimethylacetamide and propylene glycol monomethyl ether solvent system.

8. The method of claim 1 which utilizes an alkoxylated linear alcohol nonionic surfactant having a cloud point of 760° C.

9. The method of claim 1 which utilizes wherein the ultraviolet dye detection agent comprises a fluorescent diaminostilbenedisulfonic acid-cyanuric Chloride.

10. The method of claim 1 wherein the resin tackifier is a grain resin-modified maleic resin having a melting point between about 150° C.–200° C. and a total acid number (TAN) between about 150 mg–250 mg KOH/g.

11. The method of claim 1 wherein the polyurethane thermal plastic polymer has a softening point between about 50° C. and 80° C.

* * * * *